Figure 1:
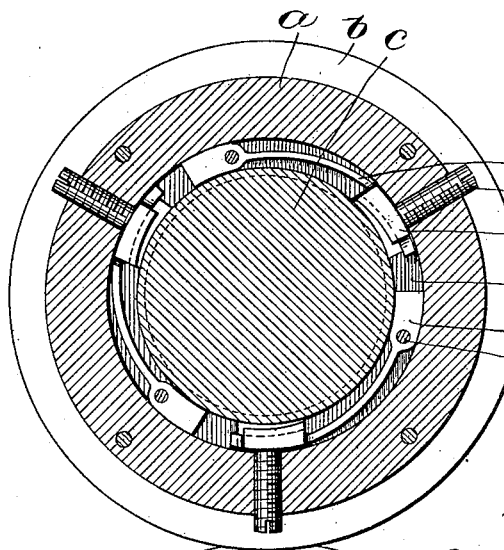
Figure 1:
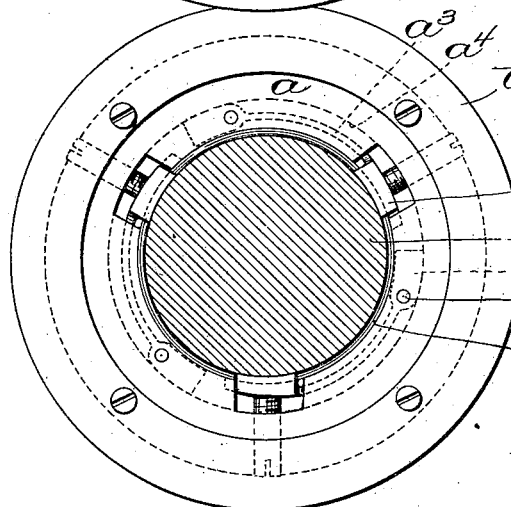

No. 728,692. PATENTED MAY 19, 1903.
L. F. FALES.
FASTENING DEVICE FOR CONNECTING COLLARS AND SHAFTS.
APPLICATION FILED AUG. 11, 1902.
NO MODEL.

Witnesses:
Jas. J. Maloney.
Nancy P. Ford.

Inventor,
Lewis F. Fales,
by J. P. and H. P. Livermore
Attys.

No. 728,692. Patented May 19, 1903.

UNITED STATES PATENT OFFICE.

LEWIS F. FALES, OF WALPOLE, MASSACHUSETTS.

FASTENING DEVICE FOR CONNECTING COLLARS AND SHAFTS.

SPECIFICATION forming part of Letters Patent No. 728,692, dated May 19, 1903.

Application filed August 11, 1902. Serial No. 119,233. (No model.)

*To all whom it may concern:*

Be it known that I, LEWIS F. FALES, of Walpole, county of Norfolk, and State of Massachusetts, have invented an Improvement in Fastening Devices for Connecting Collars and Shafts, of which the following description, in connection with the accompanying drawings, is a specification, like letters on the drawings representing like parts.

The present invention relates to a fastening device for securing a collar of any kind upon a shaft, especially in the case of a rotatable collar which is to be locked to a shaft by which it is to be rotated.

The invention is particularly adapted for use in paper-slitting machines in which the slitters or blades are mounted upon rotatable shafts and in some cases necessarily mounted close together.

One purpose of the invention is to make it practicable to secure a comparatively narrow collar, in which there is a very short lateral bearing-surface, upon the shaft in such a manner that the said collar will be securely connected with the shaft and at the same time will remain exactly coaxial with the shaft, and therefore run true.

It has been the custom heretofore to provide the collars with elongated hub portions of sufficient length to afford a long lateral bearing on the shaft, and in cases where the cutter-blades must be close together the hubs interfere, so that the collars cannot be mounted as close together as is desirable without shortening the hubs to such an extent that insufficient lateral bearing-surface is afforded to keep the collars true.

It is the purpose of the present invention to provide a comparatively narrow collar with fastening devices which will hold the said collar firmly on the shaft without permitting the collar to work loose or get out of true, and at the same time without extending the bearing-surface laterally so that the bearing-surface of one collar will interfere with the adjacent collar on the shaft.

In accordance with the invention each collar is provided with a series of bearing-surfaces transverse to the axis of the collar, the said bearing-surfaces being movable toward and from corresponding bearing-surfaces on the shaft, so that the said bearing-surfaces can be brought together after the collar is in the proper position and forced into contact, so as to lock the two parts together. It is further practicable in accordance with this construction to form the coöperating bearing portions in the shape of coöperating screw-threads, so that after the coöperating portions are brought into engagement a delicate adjustment of the positions of the collar with relation to the shaft may be obtained by turning the collar on the shaft before the coöperating surfaces are forced into locking engagement with each other. In the case of a paper-slitting machine, for example, the collar on one shaft can be moved into close proximity to the corresponding collar on the other shaft while the coöperating engaging portions are completely separated, and then by bringing the said coöperating portions into engagement and turning the collar the proper adjustment can be reached and the collar subsequently locked. It is obvious that either or both shafts of the machine may be screw-threaded, or if a delicate adjustment is not required the engaging portions may be cut without pitch and the collar locked in any position to which it may be moved along the shaft.

Figure 2:
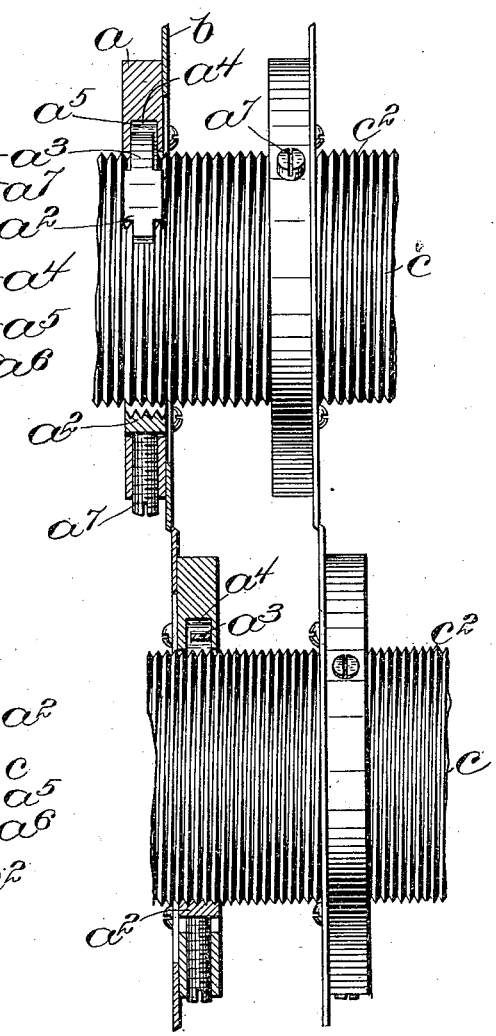

Figure 1 is a transverse section through two shafts of a paper-slitting machine and slitter-collar thereon, which are shown as constructed in accordance with this invention, the upper collar being shown as unlocked and the lower collar as locked; and Fig. 2 is a front view, partly in section and partly in elevation, showing two collars secured to each shaft and in proper position to coöperate with each other in slitting paper.

The collar $a$, which is herein shown as affording the support for a circular slitting-blade $b$, is provided with a central opening large enough to permit the said collar to be slipped over the shaft $c$. To secure the said collar upon the shaft, the latter is provided with transverse engaging surfaces, shown as channels $c^2$, which may, if desired, be cut on a pitch after the manner of an ordinary screw-thread, the collar having corresponding engaging portions—that is to say, tongues to fit the channels—the said engaging portions being herein shown as formed on members which are capable of being forced into locking engagement with the corresponding portion of the shaft by locking means movable toward the shaft. As herein shown, the said members $a^2$ are formed at the ends of spring-arms $a^3$, secured in an annular channel $a^4$, the said arms having portions $a^5$, which fit closely in the channel and are secured by transverse screws or rivets $a^6$. The said spring-arms $a^3$ are so shaped as to hold the members $a^2$ in the position shown in the upper part of Fig. 1, except when the stress of the spring is counteracted by means of a suitable locking device, such as a screw $a^7$, which is shown as threaded in a radial opening in the collar and bearing at one end upon the member $a^2$. With the parts in the position shown in the upper portion of Fig. 1 the collar can be slipped on over the shaft to the desired position and then clamped by turning the screws $a^7$, which move toward the shaft to force the members $a^2$ into locking engagement with the corresponding surface of the shaft $c$.

If a delicate adjustment is required, the channels can be cut in the shape of a screw-thread, as shown, and after the collar has been moved approximately to the position desired the screws $a^7$ can be turned far enough to bring the members $a^2$ into engagement with the corresponding threads, but not into locking engagement therewith, so that by turning the collar with relation to the shaft the proper adjustment can be obtained before the collar is locked to the shaft.

In the case of a paper-slitting machine, for example, after a collar on one shaft has been locked in the desired position the collar on the other shaft can be slipped until the two cutter-blades are approximately in the proper relative position, and the final delicate adjustment can be then obtained by turning the free collar, which can then be locked by a further turn of the screws $a^7$. By this construction a comparatively long bearing-surface is obtained, which, however, does not extend laterally beyond the collars, so that the collars can be set as close together as is necessary. Furthermore, the collars will be firmly held in any desired position, the interlocking tongues and channels, whether in form of screw-threads or not, affording a lateral support for the collar at intervals around the shaft, thereby holding the collar perfectly true, with its axis parallel to that of the shaft.

It is sometimes desirable in a paper-slitting machine of the class chosen to illustrate the present invention to afford means whereby the blades can yield slightly with relation to each other, so that they will not be worn away too fast if they happen to set too close together.

As herein shown, the spring-arms $a^8$ are slightly narrower than the channel $a^4$, in which they lie, so that it is possible for them to yield laterally to a slight extent, whereby the collar itself may have the slight lateral play necessary to maintain the slitter-blades together without too strong a frictional engagement between them.

While the device embodying the invention is particularly useful in the case of a paper-slitting machine for the reasons hereinbefore pointed out, it is to be understood that it is not limited to any such particular use, since it may obviously be employed in any case where a member in the shape of a collar is to be secured upon a shaft, so as to be held coaxial therewith. Furthermore, it is not intended to limit the invention to the specific construction shown and described, since modifications may be made without departing from the invention.

I claim—

1. The combination with a shaft provided with annular tongues and channels transverse to its axis; of a member surrounding the said shaft; locking means connected with said member and provided with corresponding tongues and channels; and means movable toward the shaft for forcing the tongues of one part into locking contact with the channels of the other, substantially as described.

2. The combination with a shaft provided with tongues and channels transverse to its axis; of a member surrounding the said shaft and provided with corresponding tongues and channels; and locking means movable toward the shaft for forcing the tongues in one part into locking contact with the channels of the other part, substantially as described.

3. The combination with the shaft provided with channels transverse to its axis; of a collar adapted to fit over the said shaft; a series of movable members connected with the collar and provided with tongues to fit the channels on the shaft; and means coöperating with each of said members to move the same toward the shaft and force the tongues thereon into locking engagement with the channels of the shaft, as set forth.

4. The combination with the shaft provided with screw-threads; of a collar adapted to fit over the said shaft; a series of movable screw-threaded members connected with the collar; and means coöperating with each of said screw-threaded members to move the same toward the shaft, as set forth.

5. The combination with a shaft provided with screw-threads; of a collar adapted to fit over the said shaft; a series of correspondingly-threaded members spring-supported in said collar; and means for forcing the said members into engagement with the shaft against the action of the spring-supports therefor, substantially as described.

6. The combination with the shaft, of a collar provided with an annular channel; clamping members in alinement with said channel; spring-supports for said members, also in said channel, the width of said spring-supports being less than the width of the channel; and clamping-screws for forcing said members into engagement with the shaft, as set forth.

In testimony whereof I have signed my name to this specification in the presence of two subscribing witnesses.

LEWIS F. FALES.

Witnesses:
GEORGE A. FALES,
MARGARET C. DALTON.